(12) United States Patent
Itoh

(10) Patent No.: US 8,298,378 B2
(45) Date of Patent: Oct. 30, 2012

(54) METHOD FOR TREATING WASTE WATER CONTAINING OXYGEN-CONTAINING COMPOUND HAVING PHENOLIC HYDROXYL GROUP OF CARBONYL GROUP

(75) Inventor: Kenji Itoh, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1221 days.

(21) Appl. No.: 11/909,304

(22) PCT Filed: Mar. 24, 2006

(86) PCT No.: PCT/JP2006/006779
§ 371 (c)(1),
(2), (4) Date: Sep. 21, 2007

(87) PCT Pub. No.: WO2006/104222
PCT Pub. Date: May 10, 2006

(65) Prior Publication Data
US 2010/0140076 A1    Jun. 10, 2010

(30) Foreign Application Priority Data

Mar. 29, 2005 (JP) ................................. 2005-094039
Mar. 29, 2005 (JP) ................................. 2005-094040

(51) Int. Cl.
*B01D 3/34* (2006.01)
*B01D 8/00* (2006.01)
*C02F 1/04* (2006.01)
*C02F 1/66* (2006.01)
*C07C 37/74* (2006.01)

(52) U.S. Cl. ....... 203/10; 203/14; 203/37; 203/DIG. 25; 568/754; 568/798

(58) Field of Classification Search .................... 203/10, 203/14, 37, DIG. 25; 210/774; 568/754, 568/798
See application file for complete search history.

(56) References Cited

U.S. PATENT DOCUMENTS

| | | | |
|---|---|---|---|
| 3,829,509 A | | 8/1974 | Charles et al. |
| 4,113,615 A | * | 9/1978 | Gorbaty ....................... 210/694 |
| 4,160,725 A | | 7/1979 | Josis et al. |
| 4,874,530 A | | 10/1989 | Kobayashi et al. |

(Continued)

FOREIGN PATENT DOCUMENTS

CN    1371871 A    10/2002

(Continued)

OTHER PUBLICATIONS

Supplementary European Search Report, dated Mar. 30, 2012, in European Patent Application No. 06730727.2.

*Primary Examiner* — Virginia Manoharan
(74) *Attorney, Agent, or Firm* — Sughrue Mion, PLLC

(57) ABSTRACT

A method for treating a wastewater containing oxygen-containing compound having a phenolic hydroxyl group or a carbonyl group, including
a step of adding an alkali agent to the wastewater containing the oxygen-containing compound having a phenolic hydroxyl group or a carbonyl group to control a pH of the wastewater to 10 or more; and
a step of separating a discharge in which the oxygen-containing compound having a phenolic hydroxyl group or a carbonyl group is concentrated through distillation of the wastewater to which the alkali agent has been added.

3 Claims, 1 Drawing Sheet

U.S. PATENT DOCUMENTS

| | | | |
|---|---|---|---|
| 5,221,440 A * | 6/1993 | Miyagi et al. | 203/14 |
| 5,344,528 A | 9/1994 | Bossler et al. | |
| 5,883,268 A * | 3/1999 | Lin et al. | 549/529 |
| 6,583,326 B2 | 6/2003 | Schwarz et al. | |
| 6,700,024 B2 * | 3/2004 | Du Cauze de Nazelle et al. | 568/571 |

FOREIGN PATENT DOCUMENTS

| | | |
|---|---|---|
| JP | 49-034971 B1 | 9/1974 |
| JP | 63-143991 A | 6/1988 |
| JP | 8-502524 A | 3/1996 |
| JP | 9-253624 A | 9/1997 |
| JP | 2004-515484 A | 5/2004 |
| WO | WO 02/46133 A1 | 6/2002 |

\* cited by examiner

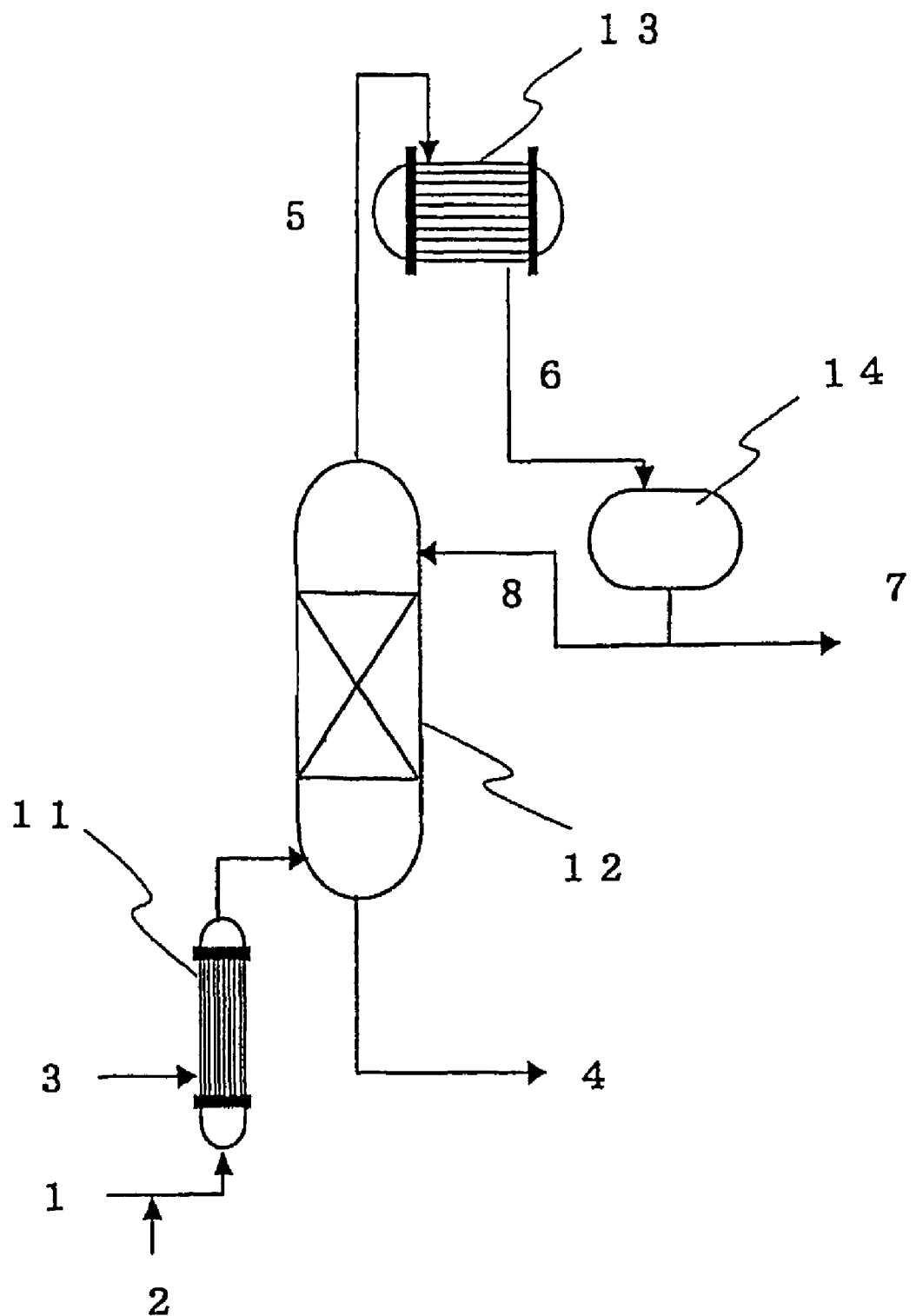

METHOD FOR TREATING WASTE WATER CONTAINING OXYGEN-CONTAINING COMPOUND HAVING PHENOLIC HYDROXYL GROUP OF CARBONYL GROUP

TECHNICAL FIELD

The present invention relates to a method for treating a wastewater containing an oxygen-containing compound having a phenolic hydroxyl group or a carbonyl group. More particularly, the present invention relates to a method for treating a wastewater containing an oxygen-containing compound having a phenolic hydroxyl group or a carbonyl group, having an excellent characteristic that the method can easily concentrate and separate the oxygen-containing compound in the wastewater containing the oxygen-containing compound having a phenolic hydroxyl group or a carbonyl group.

BACKGROUND ART

Since a water-soluble oxygen-containing compound having a phenolic hydroxyl group or a carbonyl group in a process wastewater discharged from a process for the production of a phenol or the like, is contained, the wastewater cannot be discharged without treating. Therefore, it is generally discharged after distillation separation and removal of the oxygen-containing compound having a phenolic hydroxyl group or a carbonyl group by a treatment such as a biological treatment after diluting it with a large amount of water or a treatment of burning incineration. By the way, when phenol as a worthy component is separated and purified from a reaction mixture, regarding a method for separating an oxygen-containing compound having a carbonyl group contained as by-products in the reaction mixture by distillation, various improvements are conducted (For example, see JP-A-2004-515484). But, as trials for reducing a load of post-treatment step of a wastewater through separation of a trace amount of by-products contained in a process wastewater by distillation, a purification-separation method of water-phenol by two-columns system using azeotropic distillation, is only proposed (For example, see JP-A-09-253624), and, reduction of an energy cost for distillation of a wastewater with respect to removal of an oxygen-containing compound having a phenolic hydroxy group or a carbonyl group as a by-product, and as a method for reduction of a load of an oxygen-containing compound having a phenolic hydroxyl group or a carbonyl group in a biological treatment are not described in the above document, and increased rationalization has been required.

DISCLOSURE OF THE INVENTION

Under such situations of the conventional techniques, an object of the present invention is to provide a method for treating a wastewater containing oxygen-containing compound having a phenolic hydroxyl group or a carbonyl group, having an excellent characteristic that the method can easily concentrate and separate the oxygen-containing compound in the wastewater containing the oxygen-containing compound having a phenolic hydroxyl group or a carbonyl group.

Namely, the present invention relates to a method for treating a wastewater containing oxygen-containing compound having a phenolic hydroxyl group or a carbonyl group, which comprises the following steps:

First step: a step of adding an alkali agent to the wastewater containing the oxygen-containing compound having a phenolic hydroxyl group or a carbonyl group to control a pH of the wastewater to 10 or more; and Second step: a step of separating a discharge in which the oxygen-containing compound having a phenolic hydroxyl group or a carbonyl group is concentrated through distillation of the wastewater to which the alkali agent has been added.

Particularly, the present invention is suitably applied to a case that the wastewater containing the oxygen-containing compound having a phenolic hydroxyl group or a carbonyl group, is a wastewater generated in a production process for obtaining propylene oxide by reacting an organic peroxide with propylene in the presence of a catalyst, further, when the organic peroxide is cumene hydroperoxide or ethylbenzene hydroperoxide, the method is one of effective embodiments of the present invention (herein-after, an oxygen-containing compound having a phenolic hydroxyl group may be referred to as "phenol" as synonym and an oxygen-containing compound having a carbonyl group may be referred to as "carbonyl compound" as synonym.).

Besides, the wastewater in the present invention includes a wastewater containing a phenol, a wastewater containing a carbonyl compound, and a wastewater containing both of a phenol and a carbonyl compound.

BRIEF DESCRIPTION OF THE DRAWING

FIG. 1 is a flow sheet showing an example of embodiments of the present invention. A case of which the wastewater was a phenol-containing wastewater was shown.

DESCRIPTION OF NUMBER CODE

1. Wastewater containing a phenol, 2. Alkali agent, 3. Heating medium, 4. Wastewater in which a phenol is concentrated, 5. Overhead gas, 6. Overhead condensate, 7. Wastewater in which a phenol has been removed, 8. Refluxed liquid, 11. Heater, 12. Distillation column, 13. Cooler, 14. Reflux drum

BEST MODE FOR CARRYING OUT THE INVENTION

In the present invention, a phenol-containing wastewater is a process wastewater containing a phenol, an alkylphenol having an alkyl group as a substituent group, catecol, resorcinol, hydroquinone or the like, for example, a wastewater generated in a production process for obtaining propylene oxide by reacting an organic peroxide with propylene in the presence of a catalyst, and when the organic peroxide is cumene hydroperoxide or ethylbenzene hydroperoxide, phenol is produced by decomposition of cumene hydroperoxide or ethylbenzene hydroperoxide, it is discharged as the process wastewater.

Further, in the present invention, a wastewater containing an oxygen-containing compound having a carbonyl group is a process wastewater containing a ketone such as acetone, ethylmethylketone and diethylketone, an aldehyde such as formaldehyde, acetaldehyde and propionaldehyde, a hemiacetal produced by adding of an alcohol to the aldehyde, or acetal. For example, a wastewater generated in a production process for obtaining propylene oxide by reacting an organic peroxide with propylene in the presence of a catalyst, and when the organic peroxide is cumene hydroperoxide or ethylbenzene hydroperoxide, ketones are produced by decomposition of cumene hydroperoxide or ethylbenzene hydroperoxide, these are discharged as the process wastewater.

The present invention is described in detail below based on a flow chart (FIG. 1) showing one example of embodiments of the present invention.

The flow chart of the example shown in FIG. 1 is mainly composed of a heater 11, a distillation column 12, cooler 13 and reflux drum 14.

The first step is a step of adding an alkali agent to a wastewater containing the oxygen-containing compound having a phenolic hydroxyl group or a carbonyl group.

As the alkali agent, an alkaline wastewater of pH of 10 or more discharged from a chemical process as well as NaOH, $Na_2CO_3$, $Ca(OH)_2$, $CaCO_3$ and KOH, can be used. The alkali agent is added so that a pH of a wastewater after it was mixed becomes 10 or more. Preferably, it is added so that the pH becomes between 10 and 14. As an adding method, there is not particular limitation, an agitation vessel may be separately installed and the alkali agent may be added thereto, and the addition may be a line-mixing in which the alkali agent is charged into a pipeline.

When the added amount of the alkali agent is too large, it becomes uneconomical, but when too small, the effect of the present invention cannot be obtained. When the wastewater containing an oxygen-containing compound having a phenolic hydroxyl group or a carbonyl group is controlled to a pH of 10 or more through mixing with the alkali agent, the phenol becomes heavy through a formation of a salt of the phenol and the carbonyl compound becomes heavy through condensation, therefore, separation of each of them from water becomes easy.

The second step is a step of supplying a phenol- or a carbonyl compound-containing wastewater to a distillation column 12 through a heater 11, and then separating a wastewater in which the phenol or carbonyl compound is concentrated through distillation.

The phenol- or carbonyl compound-containing wastewater is heated with a heater 11 after mixed with the alkali agent, and then, subjected to distillation with the distillation column 12. The outlet temperature of the heater 11 is 10 to 180° C., and as a heating source, any source such as steam or the like may be used, and the energy is efficiently used by using a discharged steam or condensate in a plant. A separation effect is improved by putting in column packings or trays inner distillation column. The distillation column 12 is operated at a temperature of 10 to 180° C. under 10 Torr (1330 Pa) to 1 MPa, preferably at a temperature of 30 to 150° C. under 50 Torr (6670 Pa) to 0.5 MPa.

From the bottom of the distillation column 12, the heavy phenol-concentrated wastewater or heavy carbonyl compound-concentrated wastewater is charged, and from the overhead, a wastewater in which the phenol or carbonyl compound was removed is distilled from the overhead.

The amount of the wastewater 4 in which the phenol or carbonyl compound are concentrated, becomes small because the condensed phenol or carbonyl compound is concentrated to a high concentration. Therefore, it is also possible to treat efficiently in economical the wastewater in the incineration.

On the other hand, the wastewater in which the phenol or carbonyl compound has been removed, distilled from the overhead of the distillation column 12, is supplied to the reflux drum 14 after condensed by cooling with cooler 13. The separation efficiency is improved by returning a part of the liquid of the reflux drum 14 as a refluxing liquid 8 to the distillation column 12. The wastewater distilled to the reflux drum 14 has been treated to a level capable of a sufficient treatment in a biological treatment.

The present invention is particularly useful when the wastewater is a one generated in a process for producing propylene oxide by reacting an organic peroxide with propylene in the presence of a catalyst, and when the organic peroxide is cumene hydroperoxide or ethylbenzene hydroperoxide, a ketone is produced by decomposition of cumene hydroperoxide or ethylbenzene hydroperoxide and it is useful in treatment of a wastewater containing the phenol and carbonyl compound.

EXAMPLE

The present invention is described in detail based on Examples and Comparative Examples below.

Example 1 and Comparative Example 1

A liquid (wastewater) containing about 0.16% by weight of phenol was used. PHs of wastewaters containing phenol were adjusted to 13 and 9 in Example 1 and Comparative Example 1, respectively, by controlling the amount added to the wastewater of an alkali agent, then the wastewaters were respectively subjected to distillation treatment. A specific volatility to water showing a rate of phenol in a wastewater distilled from the overhead, is as shown in Table 1, and it is found that most part of phenol was transferred to the phenol-concentrated wastewater discharged from the bottom.

TABLE 1

|  | Example 1 | Comparative Example 1 |
| --- | --- | --- |
| pH of Wastewater | 13 | 9 |
| Specific Volatility to Water | 0.04 | 0.66 |

Example 2 and Comparative Example 2 pHs of wastewaters containing about 0.25% by weight of hydroxyacetone as an oxygen-containing compound having a carbonyl group, were adjusted to 13 and 9 in Example 2 and Comparative Example 2, respectively, by controlling the amount of an alkali agent added to the wastewater, then the wastewaters were respectively subjected to distillation treatment. The hydroxyacetone in the wastewater was analyzed. A rate of hydroxyacetone (abbreviated as "HACT") discharged to the bottom of the distillation column, via condensation to hydroxyacetone contained in the wastewater supplied, was 1.7 wt % when the pH was controlled to 9, and 95.9 wt % when controlled to 13. From these results, it is found that most part of hydroxyacetone as a carbonyl compound, contained in the wastewater fed was condensed, and transferred to a concentrated wastewater discharged from the bottom of the distillation column.

TABLE 2

|  | Example 1 | Comparative Example 2 |
| --- | --- | --- |
| pH of Wastewater | 13 | 9 |
| HACT content of bottom liquid/ HACT content of liquid fed | 95.9 wt % | 1.7 wt % |

From the results described above, it is found that Examples in which distillation was conducted after controlling the pH to 10 or more by adding the alkali agent according to the present invention, are good in separation effect of a phenol or a carbonyl compound, in contrast, in Comparative Examples in which the pH is lower than 10, sufficient separation effect can not be obtained.

INDUSTRIAL APPLICABILITY

According to the present invention, a method for treating a wastewater containing oxygen-containing compound having a phenolic hydroxyl group or a carbonyl group, having an excellent characteristic that the method can easily concentrate and separate the oxygen-containing compound in the wastewater containing the oxygen-containing compound having a phenolic hydroxyl group or a carbonyl group, is provided.

The invention claimed is:

1. A method for treating a wastewater containing oxygen-containing compound having a phenolic hydroxyl group or a carbonyl group, which comprises the following steps:
    First step: a step of adding an alkali agent to the wastewater containing the oxygen-containing compound having a phenolic hydroxyl group or a carbonyl group to control a pH of the wastewater to at least 10; and
    Second step: a step of separating a discharge in which the oxygen-containing compound having a phenolic hydroxyl group or a carbonyl group is concentrated through distillation of the wastewater to which the alkali agent has been added, and the wastewater discharged from the bottom of the distillation column is incinerated.

2. The method according to claim 1, wherein the wastewater containing oxygen-containing compound having a phenolic hydroxyl group or a carbonyl group, is a wastewater generated in a production process for obtaining propylene oxide by reacting an organic peroxide with propylene in the presence of a catalyst.

3. The method according to claim 2, wherein the organic peroxide is cumene hydroperoxide.

* * * * *